June 11, 1968 A. J. BENNETT 3,387,642

SELF-THREADING NUT WITH THREAD-ENGAGING RIBS

Filed Dec. 6, 1966

INVENTOR.
ALAN JAMES BENNETT
BY

Teare, Teare & Sammon

ATTORNEYS

United States Patent Office 3,387,642
Patented June 11, 1968

3,387,642
SELF-THREADING NUT WITH THREAD-ENGAGING RIBS
Alan James Bennett, St. Leonards, England, assignor to Tinnerman Products, Inc., Cleveland, Ohio, a corporation of Ohio
Filed Dec. 6, 1966, Ser. No. 599,423
Claims priority, application Great Britain, Dec. 10, 1965, 52,522/65
13 Claims. (Cl. 151—7)

ABSTRACT OF THE DISCLOSURE

A self-threading, nut-like fastener for self-threading engagement with a threaded member. The fastener includes a body with two axially aligned bores extending through it, one of the bores being of larger diameter. Both bores communicates at a juncture between the ends of the body. A plurality of spaced, radially inwardly and axially extending thread-engaging ribs of deformable material are disposed in the enlarged bore with their innermost ends terminating adjacent the juncture.

---

This invention relates to fastening devices and particularly to a non-threaded article, such as a nut member, wherein the screw thread is formed therein by the forceful introduction of a screw threaded member.

Heretofore, a non-threaded nut of nylon, or other synthetic resinous material, has been utilized wherein a screw thread is formed by the forceful introduction of a screw threaded member, such as a bolt, but it has been found in practice, that the reaction forces acting against the nut during the cutting action often impart stresses in the material of the nut member which lead to damage of it thereby rendering it unsuitable for use.

An object of the present invention is to make a non-threaded nut of nylon, or other synthetic resinous material, which will overcome the foregoing difficulty without in any way necessitating any deviation in the manner of applying the nut to a bolt under present practice.

Briefly, the foregoing object is accomplished by providing spaced ribs within a bore of the nut, which are progressively engaged by the leading end of the thread on the bolt thus initially cutting a thread on a line, the length of which is considerably less than the circumference of the bore. Such progressive engagement may continue for a distance axially of the nut sufficiently to impart a relatively easy starting action. Sufficient contact with the ribs in an axial direction is provided to attain firm engagement with the nut by the time that the leading end of the bolt arrives at the entrance of the main bore of the nut. Such progressive engagement is accomplished by enlarging the bore adjacent the entrance end of the nut and by providing spaced ribs which extend radially inwardly from the enlarged bore. Such ribs, at one end, terminate adjacent the main bore and at the other end in the region of the entrance zone for the leading end of the bolt.

Referring to the drawings.

Figure 1:
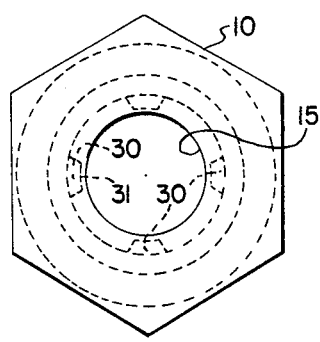
FIG. 1 is an end view of a nut embodying the present invention.
Figure 2:
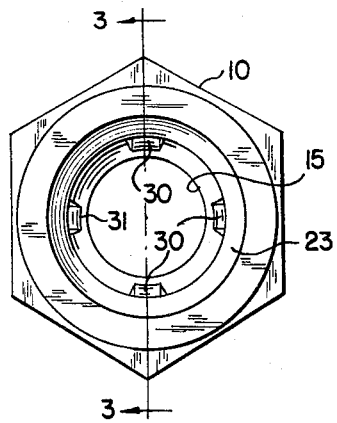
FIG. 2 is an end view of the nut, as viewed from the end opposite that shown in FIG. 2.

The nut embodying the present invention comprises a one-piece structure of nylon, or other synthetic resinous material, the body of which is indicated at 10 as having a conventional hexagonal or other non-circular external form. The nut may also have a washer 11 formed integrally therewith at the end face 12 of the nut. The nut also has a main bore 15 of uniform diameter extending axially from the end face 16 to an intermediate point 17, which preferably is located at a distance from the face 16 of more than half the distance between the face 16 and the face 18 of the nut.

The nut is also provided with an enlarged bore 20 which starts at the end 17 of the main bore and which terminates short of the face 18. As shown the termination point is indicated at 22. The body is also chamfered at 23 between the point 22 and the face 18 so as to guide the leading end of a threaded member which is intended to be used with the nut. Additionally, the body is chamfered at 24 between the main bore and the enlarged bore.

To facilitate the entrance of the threaded member into the nut the body is shown as having a plurality of spaced ribs 30 which extend radially inwardly from the enlarged bore 20 and each of which terminates at a surface 31 which is slightly larger in diameter than the diameter of the bore 15. Preferably, each rib is tapered in an axial direction with the thickest portion being adjacent the line 17 of the main bore and its thinner portion being at the end remote from the line 17. The thickness of each rib as measured in a peripheral direction may be varied, and the number of ribs may also be varied as desired. Four ribs are shown but, in practice, it is contemplated that all of the ribs, taken together at their widest extent, should not exceed a total of 50% of the circumference of the bore 15.

Figure 3:
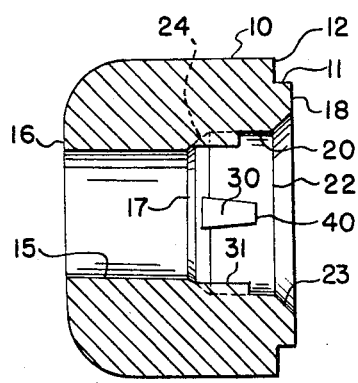
FIG. 3 is a section taken through the nut on the plane indicated by the line 3—3 of FIG. 1.

As shown in FIG. 3 the ends 40 of the ribs 30 terminate on a helix, so as to reduce the resistance to the initial cutting action by engaging the ribs progressively as the bolt is rotated. Preferably, the helix corresponds to the pitch of the thread on the bolt with which the nut is intended to be used.

Figure 4:
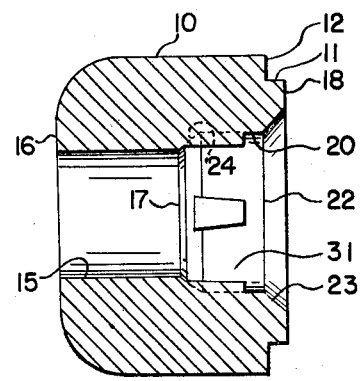
FIG. 4 is a section similar to that of FIG. 3 but showing a modified form of rib construction as utilized in carrying out the invention.

In FIG. 4 a modification is shown wherein like parts are designated by the same reference characters as used in the preceding figures. The difference, however, between the construction illustrated in FIG. 4 and that illustrated in the preceding figures, lies in the fact that the ends 40 of the ribs 30 lie in a plane which is 90° to the axis of the bore in the nut. It has been found, in practice, that for some applications it is not necessary to terminate the ends of the ribs on a helix.

In use, whenever a threaded bolt is introduced into the chamfered end of the bore 20 the ribs are encountered progressively by the lead thread of the bolt, and the material of the nut is therefore displaced initially in small amounts and hence, substantially without risk that the material of the nut will be overstressed. Part-threads are thus formed progressively in the faces of the ribs and subsequently the complete thread is formed in the main bore 15.

It is to be understood that the present invention is applicable to members other than nuts and that it can be applied to any article of any metal, which is capable of being self-threaded upon the application of a threaded member thereto.

I claim:
1. A self-threading, nut-like fastening device adapted for self-threading engagement with a threaded member comprising, a body portion having two axially aligned bores extending therein, one of said bores commencing adjacent one end of said body and having a larger diameter as compared to the diameter of the other of said bores, and the other of said bores commencing adjacent the other end of said body with both of said bores communicating at a juncture generally between the ends of said body, said junction being defined by a chamfered surface extending angularly outwardly in a direction toward said larger bore, said enlarged bore having a plurality of circumferentially spaced, radially inwardly and axially ex- tending thread-engaging ribs made of deformable material which terminate at their innermost ends at the juncture of said bores, said ribs having inner radial facing surfaces which together define a diameter which is larger than the diameter of the smaller bore, whereby said ribs are adapted to be progressively engaged by a leading end of a threaded member so that relatively small amounts of material are displaced initially from the ribs prior to self-threading engagement of the threaded member through the smaller bore.

2. An article according to claim 1 wherein the ribs are uniformly spaced around the larger bore.

3. An article according to claim 1 wherein the sides of the ribs are tapered in a direction extending axially of the bore.

4. An article according to claim 1 wherein the ends of the ribs remote from the smaller bore terminate on a helix.

5. An article according to claim 1 wherein the ends of the ribs remote from the smaller bore terminate in a plane which is normal to the axis of the bore.

6. An article according to claim 1 wherein the article has a washer-like member integral therewith on the end adjacent the larger bore and wherein the washer has a chamfered surface extending from an outer face to the larger bore.

7. An article according to claim 1 wherein the axially extending surfaces of the respective ribs are curved so as to be substantially concentric to the smaller bore.

8. A fastening device in accordance with claim 1, wherein said body portion is made of a polymeric material.

9. A fastening device in accordance with claim 1, wherein said body portion includes a chamfered surface adjacent one end, said enlarged bore opening onto said chamfered surface, and said ribs terminating at their outermost ends inwardly of said chamfered surface.

10. A fastening device in accordance with claim 1, wherein each of said ribs is tapered in an axial direction with the thickest portion being adjacent the innermost end and the thinner portion being adjacent the outermost end thereof.

11. A self-threading nut-like fastening device in accordance with claim 1, wherein said smaller bore is of uniform diameter and extends the major axial length of said body portion.

12. A self-threading nut-like fastening device in accordance with claim 1, wherein all of said ribs taken together at their widest peripheral extent comprise less than 50% of the circumference of said smaller bore.

13. An article according to claim 1, wherein the exterior of said article is provided with a polygonal configuration.

References Cited

UNITED STATES PATENTS

| | | | |
|---|---|---|---|
| 2,788,829 | 4/1957 | Edwards | 85—36 |
| 2,908,309 | 10/1959 | Brill | 151—7 |
| 3,001,567 | 9/1961 | Brill | 151—7 |
| 3,326,260 | 6/1967 | Tucker | 151—7 |

MARION PARSONS, JR., *Primary Examiner.*